(12) United States Patent
Chung et al.

(10) Patent No.: US 8,789,459 B2
(45) Date of Patent: Jul. 29, 2014

(54) FOOD HEATING DEVICE

(76) Inventors: Terry Tae-Il Chung, Bartlett, IL (US); Loren Veltrop, Chicago, IL (US); Brian Hee-Eun Lee, West Chicago, IL (US); Donald Van Erden, Wildwood, IL (US); Christopher B. Lyons, Lagrange Park, IL (US)

(*) Notice: Subject to any disclaimer, the term of this patent is extended or adjusted under 35 U.S.C. 154(b) by 948 days.

(21) Appl. No.: 12/329,373

(22) Filed: Dec. 5, 2008

(65) Prior Publication Data
US 2010/0143556 A1    Jun. 10, 2010

(51) Int. Cl.
*A21B 5/02* (2006.01)
*A47J 37/08* (2006.01)

(52) U.S. Cl.
USPC ............ 99/373; 99/386; 99/404; 99/443 R; 99/443 C; 99/537; 426/438; 426/466; 426/518; 426/506; 426/615; 219/388; 219/400; 219/411; 83/663

(58) Field of Classification Search
CPC ......... A47J 37/08; A47J 37/045; A47J 37/01; A47J 37/015; A47J 37/044; A21D 8/06
USPC ............ 99/404, 537, 373, 386, 443; 426/438, 426/518, 615, 506, 466; 83/663; 219/388, 219/400, 411
See application file for complete search history.

(56) References Cited

U.S. PATENT DOCUMENTS

| | | | | |
|---|---|---|---|---|
| 1,519,176 A * | 12/1924 | Troger et al. | | 99/395 |
| 1,533,075 A * | 4/1925 | Lindemann | | 99/395 |
| 1,538,551 A * | 5/1925 | Harris | | 99/395 |
| 1,551,183 A * | 8/1925 | Vollbrecht | | 99/395 |
| 1,617,559 A * | 2/1927 | Wolcott | | 99/398 |
| 1,624,017 A * | 4/1927 | Shields | | 99/395 |
| 1,746,698 A * | 2/1930 | Galer | | 99/391 |
| 1,828,542 A * | 10/1931 | Padelford | | 426/458 |
| 1,927,786 A * | 9/1933 | Hunter | | 426/439 |
| 2,120,829 A * | 6/1938 | Bolling | | 432/49 |
| 2,257,351 A * | 9/1941 | Silver | | 198/550.4 |
| 2,281,271 A * | 4/1942 | Cullomer | | 99/395 |
| 2,477,814 A * | 8/1949 | MacDonald | | 99/395 |
| 2,529,253 A * | 11/1950 | Hoffman et al. | | 99/386 |
| 2,593,151 A * | 4/1952 | Johnson | | 425/142 |
| 2,598,866 A * | 6/1952 | Warp | | 425/75 |
| 2,643,495 A * | 6/1953 | Doering et al. | | 53/122 |
| 2,745,363 A * | 5/1956 | Balton | | 425/334 |
| 2,756,459 A * | 7/1956 | Kellner | | 425/93 |
| 2,949,869 A * | 8/1960 | Leeuwrik | | 432/152 |
| 2,989,932 A * | 6/1961 | Egee et al. | | 99/450.3 |

(Continued)

OTHER PUBLICATIONS

Club Toaster Model CTX-200L Manual, A.J. Antunes & Co., P/N. 1010993, Rev. D 06/09, © McDonald's Corporation.

*Primary Examiner* — Dana Ross
*Assistant Examiner* — Brett Spurlock

(57) ABSTRACT

In one embodiment, a food heating device includes a first platen and a first conveyor arranged and spaced to transport a food product between the first platen (501) and the first conveyor (503). A second platen (501) and a second conveyor (503) arranged and spaced to transport the food product (203) between the second platen (501) and the second conveyor (503). A first end of the first platen (501) is disposed near a first end of the second conveyor (503) and a first end of the first conveyor (503) is disposed near a first end of the second platen (501) such that the food product (203) is automatically transferred from the first platen (501) to the second platen (501).

15 Claims, 1 Drawing Sheet

(56) References Cited

U.S. PATENT DOCUMENTS

| | | | |
|---|---|---|---|
| 3,078,169 A * | 2/1963 | McCadam | 426/36 |
| 3,078,170 A * | 2/1963 | Leber | 426/36 |
| 3,107,391 A * | 10/1963 | Zebarth et al. | 452/139 |
| 3,371,595 A * | 3/1968 | Peters | 99/352 |
| 3,456,578 A * | 7/1969 | Pinsly | 99/339 |
| 3,494,278 A * | 2/1970 | Chaudoir | 99/386 |
| 3,517,605 A * | 6/1970 | Weiss et al. | 99/423 |
| 3,587,446 A * | 6/1971 | Gardner | 99/339 |
| 3,611,913 A * | 10/1971 | McGinley | 99/349 |
| 3,646,880 A * | 3/1972 | Norris | 99/349 |
| 3,669,007 A * | 6/1972 | Pulici | 99/450.6 |
| 3,677,171 A * | 7/1972 | Le Van | 99/339 |
| 3,683,793 A * | 8/1972 | Garnett | 99/450.1 |
| 3,689,276 A * | 9/1972 | Kummer et al. | 99/333 |
| 3,693,452 A * | 9/1972 | McGinley et al. | 99/386 |
| 3,712,207 A * | 1/1973 | McGinley et al. | 99/349 |
| 3,718,487 A * | 2/1973 | Brunner | 99/353 |
| 3,734,740 A * | 5/1973 | Zenos | 426/383 |
| 3,739,712 A * | 6/1973 | Duning | 99/349 |
| 3,785,276 A * | 1/1974 | Noor | 99/516 |
| 3,835,760 A * | 9/1974 | Rekesius | 99/331 |
| 3,861,289 A * | 1/1975 | Baker et al. | 99/404 |
| 3,952,643 A * | 4/1976 | Wolfelsperger et al. | 99/337 |
| 3,987,718 A * | 10/1976 | Lang-Ree et al. | 99/386 |
| 4,009,775 A * | 3/1977 | Wolfelsperger et al. | 198/403 |
| 4,126,946 A * | 11/1978 | Buffington et al. | 34/395 |
| 4,164,591 A * | 8/1979 | Ahlgren et al. | 426/523 |
| 4,179,985 A * | 12/1979 | Baker et al. | 99/339 |
| 4,188,866 A * | 2/1980 | Baker et al. | 99/339 |
| 4,189,631 A * | 2/1980 | Baker et al. | 219/388 |
| 4,207,810 A * | 6/1980 | Noel | 99/373 |
| 4,246,290 A * | 1/1981 | Haas et al. | 426/275 |
| 4,254,697 A * | 3/1981 | Lang-Ree et al. | 99/387 |
| 4,261,257 A * | 4/1981 | Henderson et al. | 99/386 |
| 4,266,920 A * | 5/1981 | Hayashi et al. | 425/133.1 |
| 4,281,594 A * | 8/1981 | Baker et al. | 99/386 |
| 4,286,509 A | 9/1981 | Miller et al. | |
| 4,444,094 A * | 4/1984 | Baker et al. | 99/327 |
| 4,453,457 A * | 6/1984 | Gongwer et al. | 99/345 |
| 4,455,929 A * | 6/1984 | Goudarzi et al. | 99/637 |
| 4,508,025 A * | 4/1985 | Schultz | 99/353 |
| 4,513,656 A * | 4/1985 | Fay | 99/450.4 |
| 4,530,276 A | 7/1985 | Miller | |
| 4,535,687 A * | 8/1985 | Antpohler | 99/334 |
| 4,567,819 A * | 2/1986 | Adamson | 99/386 |
| 4,569,851 A * | 2/1986 | Schultz | 426/496 |
| 4,583,451 A * | 4/1986 | Kanagy | 99/423 |
| 4,586,430 A * | 5/1986 | Tichy et al. | 100/118 |
| 4,664,359 A * | 5/1987 | Hertwich | 266/90 |
| 4,711,166 A * | 12/1987 | Chen | 99/353 |
| 4,784,869 A * | 11/1988 | Bishop | 426/523 |
| 4,914,277 A * | 4/1990 | Guerin et al. | 219/506 |
| 5,044,264 A * | 9/1991 | Forney | 99/349 |
| 5,048,403 A * | 9/1991 | Haas et al. | 99/355 |
| 5,060,561 A * | 10/1991 | Campo | 99/353 |
| 5,077,072 A * | 12/1991 | Sieradzki | 426/523 |
| 5,088,391 A * | 2/1992 | Anderson | 99/423 |
| 5,172,328 A * | 12/1992 | Cahlander et al. | 700/211 |
| 5,180,898 A * | 1/1993 | Alden et al. | 219/388 |
| 5,189,948 A * | 3/1993 | Liebermann | 99/443 C |
| 5,206,045 A * | 4/1993 | Stuck | 426/243 |
| 5,441,755 A * | 8/1995 | Haggstrom | 426/502 |
| 5,481,963 A * | 1/1996 | Sesona et al. | 99/335 |
| 5,588,354 A * | 12/1996 | Stuck et al. | 99/386 |
| 5,673,610 A * | 10/1997 | Stuck | 99/386 |
| 5,687,640 A * | 11/1997 | Sala | 99/423 |
| 5,960,704 A | 10/1999 | March et al. | |
| 5,983,785 A * | 11/1999 | Schreiner et al. | 99/386 |
| 6,153,860 A * | 11/2000 | Weng | 219/497 |
| 6,177,654 B1 * | 1/2001 | Schackmuth | 219/388 |
| 6,192,789 B1 | 2/2001 | Agcaoili et al. | |
| 6,201,218 B1 * | 3/2001 | Chandler et al. | 219/388 |
| 6,223,650 B1 * | 5/2001 | Stuck | 99/386 |
| 6,267,044 B1 * | 7/2001 | Friel, Sr. | 99/327 |
| 6,281,478 B2 * | 8/2001 | Chandler et al. | 219/388 |
| 6,322,832 B1 * | 11/2001 | Schiffmann | 426/246 |
| 6,367,371 B1 * | 4/2002 | Ni | 99/348 |
| 6,401,600 B1 * | 6/2002 | Schleh | 99/329 R |
| 6,558,725 B2 * | 5/2003 | Giraldo et al. | 426/438 |
| 6,595,117 B1 * | 7/2003 | Jones et al. | 99/386 |
| 6,629,493 B1 * | 10/2003 | Schaible et al. | 99/352 |
| 6,676,986 B1 * | 1/2004 | Huttenbauer, Jr. | 426/646 |
| 6,717,111 B2 * | 4/2004 | Sands et al. | 219/388 |
| 6,789,465 B2 * | 9/2004 | Sands et al. | 99/423 |
| 6,817,283 B2 * | 11/2004 | Jones et al. | 99/386 |
| 6,915,734 B2 * | 7/2005 | Torghele et al. | 99/348 |
| 6,930,296 B2 * | 8/2005 | Chen | 219/700 |
| 7,067,769 B2 * | 6/2006 | Sands et al. | 219/388 |
| 7,285,755 B1 * | 10/2007 | Kingdon et al. | 219/388 |
| 7,297,903 B1 | 11/2007 | March et al. | |
| 7,306,444 B2 * | 12/2007 | Heinzen et al. | 425/89 |
| 7,325,483 B2 * | 2/2008 | Szymanski | 99/349 |
| 2001/0001462 A1 * | 5/2001 | Chandler et al. | 219/388 |
| 2003/0056658 A1 * | 3/2003 | Jones et al. | 99/386 |
| 2004/0009253 A1 * | 1/2004 | Hayashi et al. | 425/208 |
| 2004/0177769 A1 * | 9/2004 | Kobayashi | 99/360 |
| 2004/0211323 A1 * | 10/2004 | Heinzen et al. | 99/349 |
| 2005/0006204 A1 * | 1/2005 | Behymer et al. | 198/494 |
| 2005/0072311 A1 * | 4/2005 | Szymanski | 99/349 |
| 2005/0109216 A1 * | 5/2005 | Jones et al. | 99/386 |
| 2005/0115418 A1 * | 6/2005 | Sands et al. | 99/423 |
| 2005/0155495 A1 * | 7/2005 | Nevarez | 99/385 |
| 2006/0236872 A1 * | 10/2006 | Nordberg et al. | 99/349 |
| 2006/0246199 A1 * | 11/2006 | Fletcher | 426/582 |

* cited by examiner

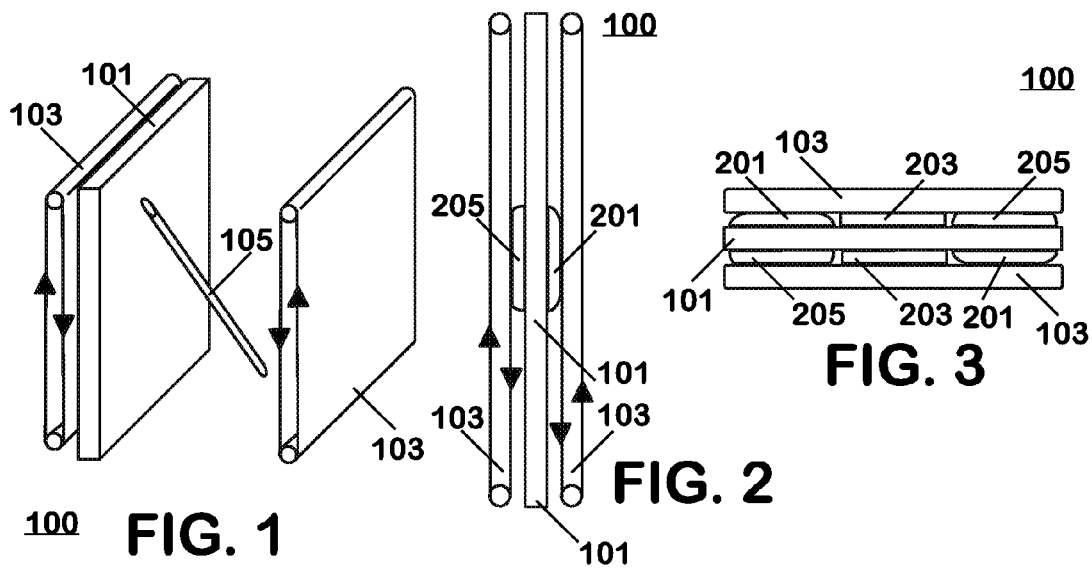
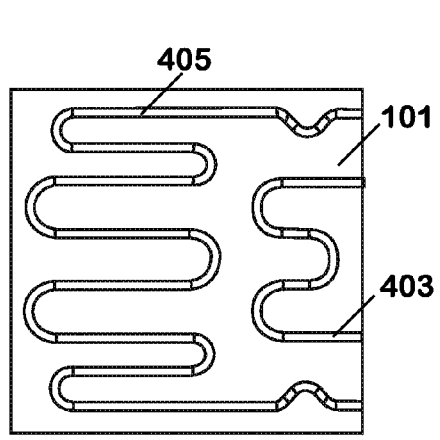
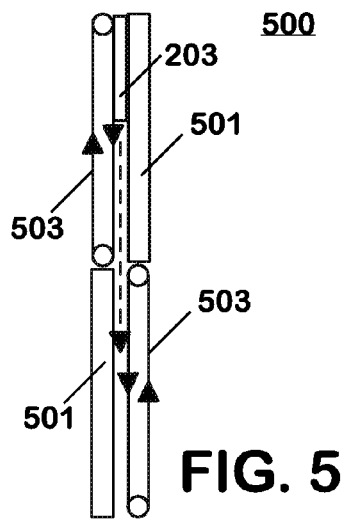
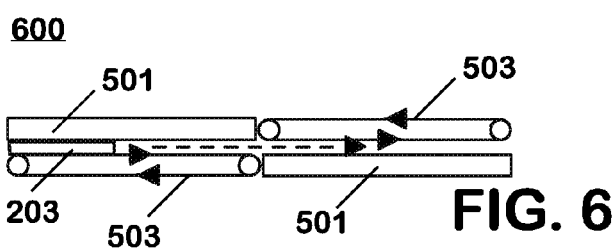
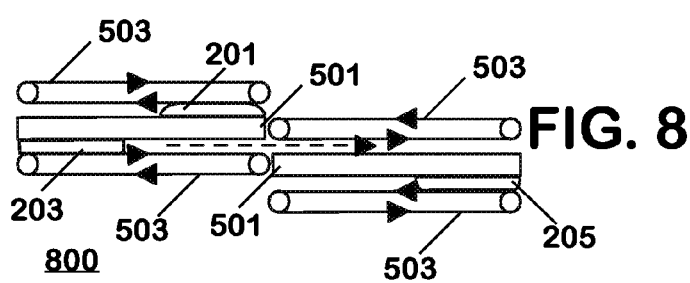

FOOD HEATING DEVICE

FIELD OF THE INVENTION

This invention relates to apparatus utilized in food preparation. Such apparatus include, but are not limited to, apparatus utilized in the heating of food products such as bread-type food products, including buns, rolls, croissants, bagels, muffins, and the like, as well as pasta, vegetables, cakes, pastries, and so forth.

BACKGROUND OF THE INVENTION

Restaurants often heat bread-type food products, referred to hereinafter as bread products, ranging from bread slices to buns, rolls, croissants, bagels, and the like. Such heating may include warming, toasting or browning (also known as a Maillard reaction), and steaming.

At times, it may be desired to process different parts of a food product differently, although the food product is desired to be completed or assembled at the same time. For example, a club-type sandwich typically includes a bun with a top, a center, and a bottom. Such a sandwich often requires the center to be toasted on both sides, while the top and bottom need only be toasted on one side.

Accordingly, there is a need for a heating device that can heat multiple parts of a food product so that all components are heated in substantially the same amount of time.

BRIEF DESCRIPTION OF THE DRAWINGS

FIG. 1 is a partially exploded perspective view of a heating device having a platen in accordance with the invention.

FIG. 2 is a side view of the platen in accordance with the invention.

FIG. 3 is a top view of the platen in accordance with the invention.

FIG. 4 is a front view of a platen with internal heating elements in accordance with the invention.

FIG. 5 is a side view of a pair of vertically disposed platens with a pair of conveyors in accordance with the invention.

FIG. 6 is a side view of a pair of horizontally disposed platens with a pair of conveyors in accordance with the invention.

FIG. 7 is a perspective view of an alternative heating device having a platen in accordance with the invention.

FIG. 8 is a side view of a pair of horizontally disposed platens with four conveyors in accordance with the invention.

DESCRIPTION OF A PREFERRED EMBODIMENT

The following describes an apparatus for and method of heating, also known as heat processing, food products, such as bread-type food products, including buns, rolls, croissants, bagels, muffins, flatbread, pitas, and the like, as well as pasta, vegetables, cakes, pastries, and so forth.

Various embodiments of platens are disclosed that heat one and/or both sides of a food product. Several embodiments include multiple platens. Each platen advantageously comprises one or more heating elements. The heating elements are utilized to heat, including, for example, to heat process, warm, toast or brown (also known as a Maillard reaction), steam, grill, defrost, and/or thaw. The platens are typically planar and may be disposed horizontally, vertically, or a combination thereof. The platens shown in the drawings are not necessarily shown proportional to their actual size. The platens are ideally comprised of a material with good heat transfer properties, such as aluminum, steel, ceramic, and/or other thermally conductive materials, and advantageously have a smooth, non-stick surface. The length, width, and temperature of the platen(s) are selected to provide the desired heating when used in conjunction with one or more conveyors, whose speed may also be variable.

A partially exploded perspective view of a heating device 100 having a platen with a guide is shown in FIG. 1. The food product is received on one or more sides of a platen 101 and directed along the platen by one or more conveyors 103. One or more optional guides 105 may direct one or more food products in a diagonal direction along the platen 101. The guide(s) 105 may be disposed on the platen 101 or one of the conveyors 103, or the guide(s) 105 may be disposed on a stand (not shown) between the platen 101 and a conveyor 103.

A conveyor 103 is disposed on each side of the platen 101. Each conveyor 103 advantageously transports one or more food products in the same direction, e.g., vertically downward, along each side of the platen 101 by use of a belt that keeps the platen 101 in contact with the food product as it slides along the platen 101. The food product is static relative to the belt of the conveyor 103, which is dynamic relative to the platen 101. As a result, the heat transfer rate is higher and food sticking is reduced. The conveyors 103 may be conventional conveyors including rollers and wire or silicone belts intended for use in the food industry. The conveyors herein may be components of a single conveyor system, having a single shared conveyor belt among multiple conveyors, or each conveyor may be separate, where each conveyor has its own conveyor belt. The claims and claim limitations should be construed accordingly. Brackets, stands, and electrical connections for the conveyors and platen (not shown) are known in the art.

A side view of the heating device 100 is shown in FIG. 2 and a top view of the heating device 100 is shown in FIG. 3. The food product is shown in FIG. 2 and FIG. 3 in the example of a 3-part bun for a round club-type sandwich, including a top 201, a center 203, and a bottom 205, so named for the sake of reference, but not necessarily orientation. With this example, which will be utilized throughout the drawings, the center 203 is desired to be toasted on both sides, whereas the top 201 and bottom 205 are toasted on one side. To toast both sides of the center 203, an operator runs the center 203 through the heating device twice, with a different side of the center 203 being transported along the platen 101 each time. Food products may be heated on both sides of the platen 101 because one conveyor 103 is disposed near a first side of the platen 101 and another conveyor 103 is disposed near a second side of the platen 101.

A front view of platen 101 with internal heating elements is shown in FIG. 4. The platen 101 may include one or more heating elements 403, 405. Many other arrangements of heating elements may be successfully utilized other than the example shown in the drawings, including, for example, one or more heating elements, different paths of the heating elements, and so forth.

A side view of a heating device 500 comprising a pair of vertically disposed platens 501 with a pair of conveyors 503 is shown in FIG. 5, and a side view of a heating device 600 comprising a pair of horizontally disposed platens with a pair of conveyors is shown in FIG. 6. In these embodiments, the food product is transported between vertically or horizontally displaced platens 501 and their corresponding conveyors 503. The first platen-conveyor 501-503 pairs are arranged "end-to-end" to automatically transfer the food product from one platen 501 to the other 501 as the food product reaches the end of the first platen-conveyor 501-503 pair. The arrangement of platens 501 and conveyors 503 are opposite so that one side of the food product is heated along one platen 501 and another side of the food product is heated along the other platen 501 without having to flip or rotate the food product. The conveyors 503 may optionally overlap horizontally or vertically to insure that the food product is transferred between platens. Thus, the first conveyor 503 guides the food product 203 along the first platen 501 until the food product reaches an end of the first platen 501, when the food product is transferred to the second platen 501, where the second conveyor 503 guides the food product 203 along the second platen 501. In this way, each platen 501 heats a different side of the food product while the food product 203 stays in the same orientation.

A perspective view of an alternative heating device 700 having a platen is shown in FIG. 7. This heating device 700 is a narrower version of the heating device 100 in FIG. 1 through FIG. 3 that facilitates heating of the top 201 and the bottom 205 while the heating device 500, 600 heats the center 203. The top 201 and bottom 205 arrive at the end of the platen 701 substantially at the same time as the center 203 arrives at the end of the second platen 501 if all three food products are placed at the beginning of the platens 501, 701 substantially simultaneously. This heating device 700 may be disposed horizontally, vertically, or a combination thereof.

A side view of an additional embodiment of a heating device 800 has a pair of horizontally disposed platens with four conveyors is shown in FIG. 8. This heating device 800 utilizes two additional conveyors 503 in addition to two conveyors 503 of the heating device 600 of FIG. 6, such that the top 201 is heated by the first platen 501 and the bottom 205 is heated by the second platen 501. All four conveyors 503 may advantageously be a single conveyor device, two, three or four conveyor devices 503 as shown.

The heating device as set forth herein has many advantages, including heating all sides of the food products as required in the same, or nearly the same, time period. Various embodiments minimize the counter space necessary for the heating device. The conveyors may be optimally used to reduce the size of the heating device. By use of a conveyor belt that keeps the platen in contact with the food product, the food product is static relative to the belt of the conveyor, which is dynamic relative to the platen, the heat transfer rate is higher and food sticking is reduced.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A food heating device comprising:
a first substantially planar platen having a first internal heating element located inside the first substantially planar platen and, a first conveyor arranged and spaced away from the first substantially planar platen by a first separation distance in order to transport a food product along and in contact with the first substantially planar platen and between the first substantially planar platen and the first conveyor, such that when the food product having first and second sides, is between the first conveyor and the first substantially planar platen, the first side of the food product will make direct contact with the first substantially planar platen;

a second substantially planar platen and a second conveyor, downstream of the first platen and first conveyor, the second platen having a second internal heating element located inside the second substantially planar platen and the second conveyor arranged and spaced away from the second substantially planar platen by a separation distance in order to transport the food product along and in contact with the second substantially planar platen between the second substantially planar platen and the second conveyor, such that when the food product is between the second conveyor and the second substantially planar platen, the second side of the food product will make direct contact with the second substantially planar platen.

2. The food heating device of claim 1, further comprising at least one guide that directs the food product diagonally along at least one of the first platen and the second platen.

3. The food heating device of claim 1, further comprising a third conveyor arranged and spaced to transport a second food product against the first platen and the third conveyor.

4. The food heating device of claim 1, wherein the first and second platens are substantially horizontal.

5. The food heating device of claim 1, wherein the first and second platens are substantially vertical.

6. The food heating device of claim 1, wherein the first platen and the second platen are substantially parallel to each other.

7. The food heating device of claim 1, wherein the first platen and the second platen are arranged and constructed to toast the food product.

8. The food heating device of claim 1, wherein the food product is static relative to a belt of at least one of the first conveyor and the second conveyor.

9. A food heating device comprising:
a first platen having a first substantially planar surface circumscribed by a first edge, the first platen comprising a first heating element inside the platen, configured to heat the first platen;
a first conveyor arranged and spaced to transport a food product between the first platen and the first conveyor such that a first surface of the food product makes direct contact with the first substantially planar surface;
a second platen, downstream of the first platen, having a second substantially planar surface circumscribed by a second edge, the second platen comprising a second heating element inside the second platen, configured to heat the second platen;
a second conveyor, downstream of the first conveyor, arranged and spaced to transport the food product between the second platen and the second conveyor such that a second surface of the food product makes direct contact with the second substantially planar surface;
wherein the first edge faces the second conveyor and wherein the second edge faces the first conveyor.

10. The food heating device of claim 9, further comprising at least one guide that directs the food product diagonally along at least one of the first platen and the second platen.

11. The food heating device of claim 9, wherein the first and second conveyors are arranged so that, when the food product is between the first conveyor and first platen, the food product is transferred automatically to the second conveyor by the food heating device.

12. The food heating device of claim 1, wherein the first and second conveyors are arranged so that, when the food product is between the first conveyor and first platen, the food product is transferred automatically to the second conveyor by the food heating device.

13. The food heating device of claim 1, wherein a first end of the first platen is disposed near a first end of the second conveyor and wherein a first end of the first conveyor is disposed near a first end of the second platen such that the food product is heated on a first side by the first platen, and is thereafter transferred from the first platen to the second platen such that the food product is heated on an opposing second side by the second platen as the food product moves responsive to the first and second conveyors.

14. The food heating device of claim 9, wherein a food product travels between the first conveyor and first platen and is heated on a first side by the first platen, the food product thereafter travels between the second conveyor and second platen and is heated on a second side by the second platen.

15. The food heating device of claim 3 further comprising a fourth conveyor arranged and spaced to transport a third food product against the second platen and the fourth conveyor.

\* \* \* \* \*